United States Patent
Bochinski et al.

[15] 3,698,699
[45] Oct. 17, 1972

[54] HOT GAS FUSION PROCESS AND APPARATUS

[72] Inventors: Julius H. Bochinski, La Habra; John E. Linkel, Orange County, both of Calif.

[73] Assignee: North American Rockwell Corporation, El Segundo, Calif.

[22] Filed: Oct. 29, 1970

[21] Appl. No.: 85,047

[52] U.S. Cl. ...................266/5 R, 29/495, 148/23
[51] Int. Cl. .................................................C21d 1/00
[58] Field of Search..........148/16, 20.3, 23; 266/5 R, 266/5 E; 29/494, 495

[56] References Cited

UNITED STATES PATENTS

| | | |
|---|---|---|
| 2,191,133 | 2/1940 | Pearson ......................266/5 R |
| 2,315,294 | 3/1943 | Stewart et al. .............266/5 R |
| 2,563,391 | 8/1951 | Browne ......................29/495 |
| 3,290,030 | 12/1966 | Goehring ...................266/5 R |
| 3,340,602 | 9/1967 | Hontz .........................29/494 |

*Primary Examiner*—Gerald A. Dost
*Attorney*—L. Lee Humphries, H. Fredrick Hamann and Martin E. Gerry

[57] ABSTRACT

A hydrazine compound in a carrier gas wherein the hydrazine compound is transformed into its gaseous state and the gaseous hydrazine is used by processing apparatus to bond metallic materials with a soldering material, to remove film compound formation from metallic surfaces, and to minimize porous formation in soldering materials which may be attached to metallic surfaces. The hydrazine compound is transported by the gaseous carrier and heated to a temperature that vaporizes the hydrazine and is used for reacting the gaseous hydrazine with the film formation on the metals or with the soldering material thereon to achieve excellent bonding characteristics and low conductivity joints.

3 Claims, 4 Drawing Figures

INVENTORS
JULIUS H. BOCHINSKI
JOHN E. LINKEL

HOT GAS FUSION PROCESS AND APPARATUS

BACKGROUND OF THE INVENTION

This invention relates to a method and apparatus for metallurgically joining or bonding metal surfaces. It particularly relates to a method for joining metal surfaces by soft soldering, brazing and solder reflowing. It also relates to a method and apparatus used for reduction of oxides from metal surfaces and for minimizing the porous character of the soldering material used to bond metals.

When metal surfaces are joined by a solder alloy, a metallic continuity is established between the solder alloy and the metal surfaces by the metallurgical bonding of the solder alloy to the metal surfaces. Normally, both the base metal and the fusible solder alloy have a thin film of tarnish on the surface which interferes with the formation of a good metallurgical bond between the base metal and the solder alloy. The tarnish films are formed on the base metal and solder alloy by environmental attack such as by atmospheric oxidation. These tarnish films typically comprise oxides or sulfides, carbonates or other metal salts.

The term "flux", as used in its chemical and metallurgical sense, means a substance or mixture used to promote fusion, especially the fusion of metals or minerals. In the metallurgical joining of metal surfaces with a solder alloy, the flux has several important functions. It acts to displace the atmospheric gas layer on the surface of the base metal and solder alloy and to then remove the tarnish films from the fluxed metals. The flux also acts to permit wetting of the base metal surface by the solder alloy. The flux may have other beneficial effects on the metallurgical bonding process depending on the type of flux and metallic surface employed.

Both organic and inorganic materials have been used as fluxes. The organic fluxes are usually divided into non-rosin base fluxes and rosin base fluxes. Of the non-rosin base fluxes, acids such as stearic acid, halogens such as glutamic hydrochloride and amines such as ethylene diamine are illustrative. The inorganic fluxes include acids such as hydrochloric acid, salts such as zinc chloride and gases such as hydrogen or forming gas.

U.S. Pat. Nos. 2,612,459, 2,612,460 and 2,756,497 show that salts of hydrazine, particularly halogen salts, have been previously used. U.S. Pat. No. 3,344,001 shows that hydrazine salt fluxes which are known in the art include hydrazine hydrobromide and hydrazine borate. U.S. Pat. No. 3,174,220 discusses the reaction product of hydrazine and urea prepared in aqueous solution in the substantial absence of other reactive materials and impurities, also reported to function as a flux.

U.S. Pat. No. 3,071,852 shows that gaseous hydrazine has been used as a fuel in combination with nitrogen trifluoride in the uniting of metal parts by fusion. Although the fusion bonding process is said to be self-fluxing, however, it is reported that the nitrogen trifluoride is the active fluxing agent.

INVENTION SUMMARY

According to one aspect of the present invention, a method is provided for metallurgically joining metal surfaces with a solder alloy, such as by soft soldering or brazing, by heating the metal surfaces and the solder alloy in the presence of a gaseous hydrazine flux. The base metal and solder alloy are heated in conventional manner to a temperature above the melting point of the solder alloy but below the melting point of the metal surfaces. The hydrazine flux acts to remove the tarnish films from the fluxed metals. Upon melting, the solder alloy wets the metal surfaces which have been cleaned of tarnish by the hydrazine flux and solidifies and establishes a metallic continuity through the solder joint and reduces porous openings in the soldering material. While this aspect of the invention will be described in terms of joining two or more metal surfaces with a solder alloy, it should be understood that the invention is equally applicable to metallurgically joining a solder alloy to a single metal surface.

In addition to soft soldering and brazing, the method of the present invention is also applicable to solder reflowing. "Solder reflowing" is generally referred to as the remelting of a solder deposit on a wetted surface. For example, when two pretinned surfaces are reflowed in contact with each other, a good solder joint can result if the tarnish layers on top of the molten solder are removed. Metal parts which have been soldered become tarnished due to environmental attack and the solder joint may loosen due to aging and handling. This solder alloy deposit can be remelted and reflowed in the presence of a gaseous hydrazine flux in accordance with the method of the present invention. The hydrazine flux acts to remove the tarnish layers which have formed on the base metal and the solder alloy deposit. The solder alloy deposit reflows and, on cooling, forms a good metallurgical bond with the base metal thereby reforming the original solder joint. This reflowing operation not only reforms and strengthens the original solder joint but also closes the porous formation in soldering material and brightens the base metal.

It is therefore an object of this invention to provide such processes and appratuses utilizing hydrazine that can be effectively used commercially for the purposes of bonding metals, removing undesirable metal films and oxides, and reducing porous formations in the soldering material used for bonding the metals.

BRIEF DESCRIPTION OF DRAWINGS

FIG. 1 is a cross-section view of an integrated circuit and a cross-section view of an apparatus.

EXEMPLARY EMBODIMENT

Hydrazine Fluxes and Method of Usage

Figure 1:
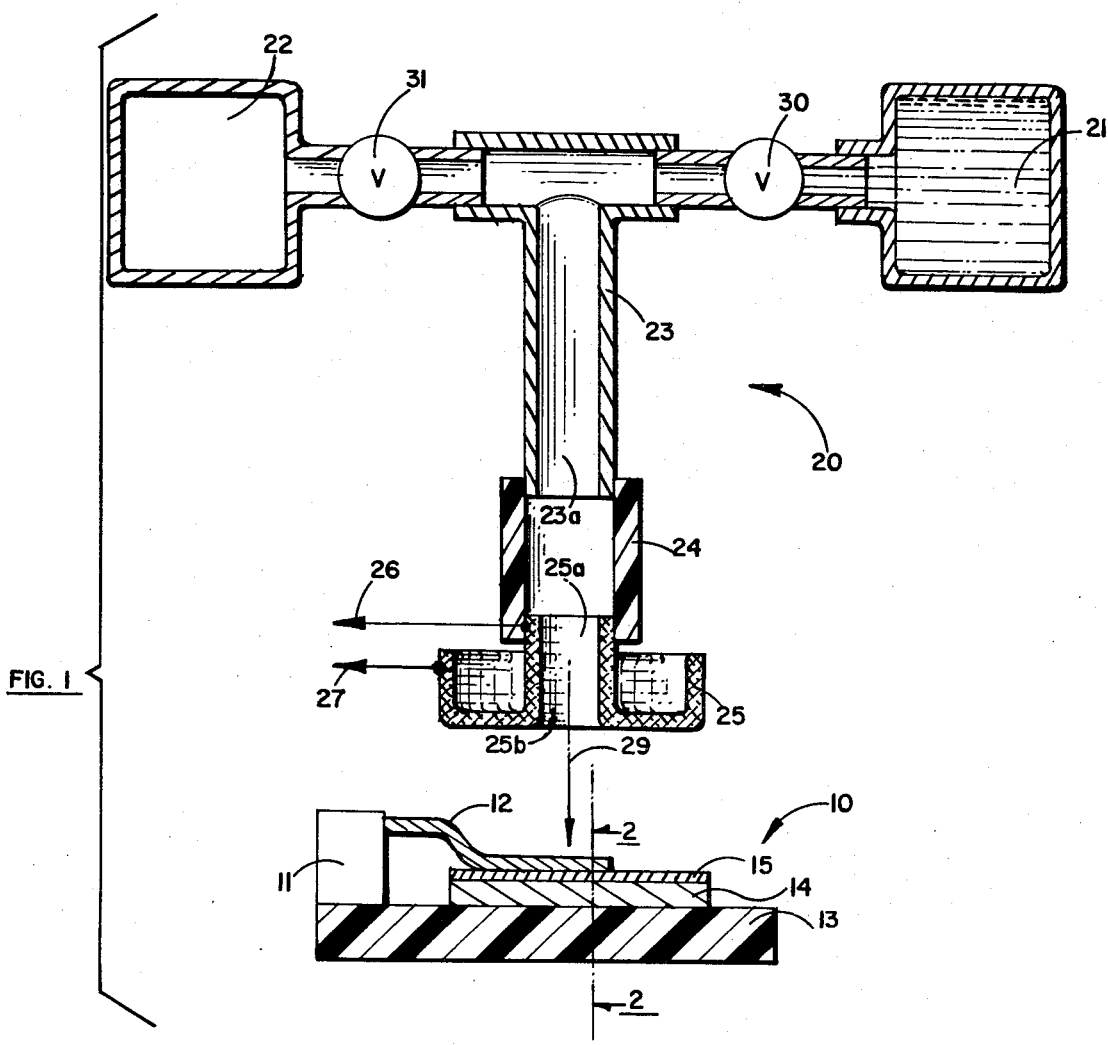
FIG. 1 shows an integrated circuit with output leads affixed to a printed circuit board and an apparatus for bonding such output leads to the printed circuit board in accordance with the invention.

The hydrazine flux employed herein may be hydrazine ($H_2NNH_2$) or any of the series of mono-, di- or trisubstituted hydrocarbon derivatives of hydrazine of the formula $R_1R_2NNHR_3$ wherein $R_1$, $R_2$ and $R_3$ are each hydrogen aliphatic such as alkyl, cycloaliphatic such as cycloparaffin or aromatic such as phenyl. The preferred class of hydrazine fluxes has the above general formula wherein $R_1$, $R_2$ and $R_3$ are each hydrogen or alkyl of one to five carbon atoms. The most preferred hydrazine flux is unsubstituted hydrazine ($H_2NNH_2$).

The expression "soldering" as used herein refers to the joining of metal surfaces by means of a lower melting solder alloy and includes soft soldering, brazing and solder reflowing. The expression "solder alloy" as used herein refers to a lower melting alloy whether conventionally denoted as a solder alloy or a brazing alloy. Percentages used herein are by weight unless specified to be by volume.

The temperature at which a flux, or some atomic or molecular species generated thereby, acts to remove the tarnish film from metals, such as by reduction of metal oxide to the corresponding free metal, is referred to as the "temperature of activation". This temperature is unique, as is well known in the art, for every base metal and/or solder alloy. Accordingly, the metal surface/solder alloy joint must not only be heated to a temperature above the melting point of the solder alloy but must also be heated to the temperature of activation of the flux so that the tarnish film on the metals is removed. The temperature of activation for any given base metal/solder alloy combination can easily be determined by heating the solder joint in the presence of the gaseous hydrazine flux until the tarnish film is removed which can be determined by observing the point at which the fluxed metals noticeably brighten indicating that the metal oxides or other tarnish components have been reduced to free metal.

It is generally preferred to conduct the fluxing for soldering applications at a temperature between about 350 and 525° F. However, higher temperatures, for example, in the range of 800° F can be employed if, for example, brazing alloys are used instead of solder alloys. The hydrazine flux should not be heated to a temperature where complete decomposition of the flux to, for example, ammonia and nitrogen occurs before the flux is brought in contact with the workpiece. For soldering applications, the lower temperature range at which the hydrazine flux can be employed is limited only by the necessity for operating above the melting point of the solder alloy, assuming, of course, that the hydrazine flux is at a temperature of activation so that the tarnish films will be removed.

Any conventional solder alloy can be metallurgically bonded to a base metal according to the present invention. It is understood, of course, that the range of the melting point of the solder alloy and the range of the temperature of activation of the hydrazine flux must overlap at a temperature which is below the melting point of the base metal. Examples of common solder alloys which can be employed according to the present invention are soft solders composed of tin and lead and indium solders composed of indium and tin.

Suitable base metals which can be used according to the present invention include both ferrous and non-ferrous metals such as copper, gold, silver and nickel. Since the tarnish film on the base metal is normally a base metal salt or oxide, the base metal must be capable of being reduced by the hydrazine flux at the metallurgical bonding temperature. Copper, gold, silver and nickel are merely illustrative of the conventional base metals whose salts and oxides can be reduced to free metal by the hydrazine flux of the present invention at conventional metallurgical bonding temperatures and, accordingly, any base metal having similar properties can be employed.

Since the hydrazine fluxes used herein are highly reactive at elevated temperatures, they should be handled in non-catalytic containers such as glass or other suitably lined vessels. Additionally, since pure hydrazine vapor, for example, explodes when sparked at 212° F and since an approximately 4.7 percent by volume mixture of hydrazine and air is flammable, it is preferred to carry the hydrazine flux to the workpiece with an inert carrier gas. The carrier gas should be inert toward the hydrazine flux and workpiece and should not interfere with the metallurgical bonding process. Nitrogen and helium are illustrative of the inert carrier gases which can be employed.

The hydrogen flux and inert carrier gas mixture can conveniently be prepared in accordance with one of the following two procedures wherein unsubstituted hydrazine is used as illustrative of the hydrazine flux. According to the first procedure, dry carrier gas is bubbled through pure, liquid hydrazine. The hydrazine is heated to a temperature which will produce a sufficient hydrazine vapor pressure to provide the desired concentration of hydrazine in the inert carrier gas. For example, about a 5 percent by volume hydrazine — 95 percent by volume nitrogen gas stream is produced when nitrogen is bubbled through hydrazine heated to a temperature of about 100° F. In like manner, about an 8 percent by volume hydrazine — 92 percent by volume nitrogen gas stream is produced by heating the hydrazine to a temperature of about 130° F. According to the second procedure, gaseous hydrazine and water is generated from an aqueous hydrazine solution at a rate sufficient to provide the desired hydrazine concentration in the inert carrier gas. It is preferred to use an aqueous hydrazine solution containing less than about 45 percent hydrazine since these aqueous solutions are not flammable. The aqueous hydrazine solution may conveniently contain, for example, between 35 and 40 percent hydrazine. Regardless of the procedure employed for preparing the hydrazine flux inert carrier gas mixture, it is generally preferred to use a hydrazine concentration of about a 1 to 10 percent by volume. It is generally preferred to preheat the hydrazine flux — inert carrier gas stream to approximately the metallurgical bonding temperature before passing it over the workpiece in order to obtain an efficient fluxing operation. This preheating step can be accomplished in conventional manner in a non-catalytic preheating zone once the hydrazine flux — inert carrier gas stream is generated by, for example, one of the above procedures.

Since it is usually not possible to determine in advance the exact nature and quantity of the tarnish films, it is generally preferred to use a large excess of hydrazine flux to insure complete removal of all of the tarnish films. The invention may be conveniently practiced by passing the hydrazine flux — inert carrier gas mixture over the workpiece until the surface of the workpiece noticeably brightens indicating that removal of the tarnish films has been affected. The exact dwell time of the gaseous hydrazine flux at the workpiece will, of course, depend on the solder system employed but can be easily regulated since the hydrazine flux is continuously supplied to the workpiece by the inert carrier gas.

The hydrazine flux soldering of the present invention is particularly adapted for use in a printed circuit soldering line. The printed circuit soldering may be conducted in conventional manner except that gaseous hydrazine, for example, is used as the flux in place of the conventional flux such as rosin or hot hydrogen gas. Since the gaseous hydrazine fluxes of the present invention generally exhibit much lower activation temperature than the conventional gaseous fluxes such as hydrogen gas, they are particularly useful in printed circuit soldering and in other applications where the working temperature range is very limited. Since the printed circuit board on which the electrical circuit is printed is typically formed from an epoxy resin, the printed circuit soldering is normally conducted at a temperature below about 525° F in order to avoid melting or damaging the epoxy resin substrate. The workpiece is conveniently heated to about 450 to 525° F; however, the temperature employed is dependent on the specific application of the printed circuit assembly. A 63/37 or 60/40 tin-lead solder is normally recommended for the average assembly.

While the invention has been discussed above in terms of its applicability to soft soldering, brazing and solder reflowing, it should be understood that the invention is applicable to any conventional metallurgical bonding process wherein a flux is needed to remove tarnish films from the metal surfaces to permit the metal surfaces to form a good metallurgical bond and wherein the gaseous hydrazine flux of the present invention does not interfere with the metallurgical bonding process. For example, in addition to metallurgical bonding processes in which a lower melting alloy is used to join two or more metal surfaces, the present invention is also usable in solid state diffusion bonding processes in which the formation of a good metallurgical bond is achieved by allowing two or more metal surfaces to diffuse into each other. In solid state diffusion bonding, the metal surfaces are heated and brought into intimate contact by applying pressure. The operating conditions for this type of process strongly depend on the nature of the metals and may require, in some instances, the application of high vacuum in order to remove absorbed gases from the metal surfaces. Provided that the metal surfaces are sufficiently clean, a good metallurgical bond will be formed by diffusion at temperatures below the melting points of the metals and in the absence of a lower melting alloy. The gaseous hydrazine flux of the present invention may conveniently be employed to remove tarnish films from the metal surfaces in the solid state diffusion bonding process to permit the metal surfaces to diffuse into one another and form a good metallurgical bond.

The present invention provides a method for joining metal surfaces in which temperatures considerably lower than those employed with many conventional gaseous fluxes can be used. Since the reaction products from the present fluxing operation are typically nitrogen and water, a fluxing method is provided in which no contaminating, nonvolatile reaction products are formed. When conventional solid, paste and liquid fluxes are employed residues frequently remain on and contaminate the joined metal surfaces. Additionally, the use of a gaseous hydrazine flux avoids the corrosivity exhibited by other gaseous fluxes such as dry hydrogen chloride or nitrogen trifluoride, the corrosivity of which can lead to metallurgically imperfect metal bonds.

The following non-limitive examples illustrate the invention:

EXAMPLE 1

A printed copper circuit on a conventional printed circuit board which was pretinned with a solder composed of 50 percent tin and 50 percent lead and the gold leads of a conventional integrated circuit pack were cleaned with trichloroethylene and methanol. The leads of the integrated circuit pack were placed in physical contact with the pretinned printed copper circuit and the assembly was placed in an air-tight, glass-lined furnace which was heated to approximately 450° F. The leads of the integrated circuit pack formed a good metallurgical bond with the printed copper circuit after being exposed to a hydrazine-containing gas for five minutes. The hydrazine-containing gas was generated by passing a nitrogen carrier gas at a flow rate of 150 cc/min through an aqueous hydrazine (40 percent) solution.

EXAMPLE 2

A printed copper circuit on a conventional printed circuit board, a copper wire and a solder washer composed of 63 percent tin and 37 percent lead were cleaned with trichloroethylene and methanol. The copper wire was soldered as described in Example 1 to the printed copper circuit in the presence of hydrazine-containing gas at 450° F using the solder washer. The hydrazine was supplied to the workpiece in the manner specified in Example 1. The copper wire formed a good metallurgical bond with the printed copper circuit.

EXAMPLE 3

A printed copper circuit on a conventional printed circuit board was cleaned with acetone. The printed copper circuit was pretinned with a solder composed of 50 percent tin and 50 percent lead. The printed circuit board was placed in an air-tight, glass-lined furnace and heated to approximately 525° F for 30 minutes in the presence of hydrazine-containing gas. The solder of the printed copper circuit reflowed and metallurgically bonded to the copper base metal. The hydrazine was supplied to the furnace by bubbling dry nitrogen gas at a flowrate of about 180 cc/min through liquid hydrazine heated to a temperature of about 100° F to supply approximately a 5 percent by volume hydrazine — 95 percent by volume nitrogen gas stream.

More detailed apparatuses and process steps commercially practicable are described in the bonding process and apparatus description and in the film removal and pore minimization method and apparatus therefor, as follows:

The Bonding Process and Apparatus Therefor

Figure 2:
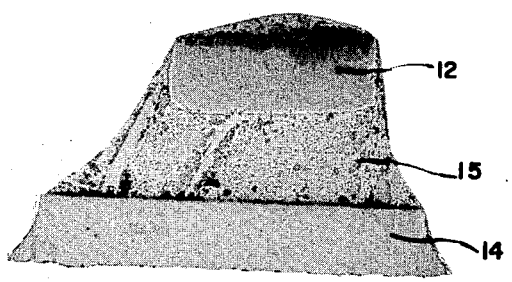
FIG. 2 is a photographic cross-section view magnified 140 times, taken at plane 2—2 of FIG. 1, showing a good bond made between an output lead and a copper printed circuit by means of a soldering material that firmly attaches to the output lead and the copper circuit.
Figure 3:
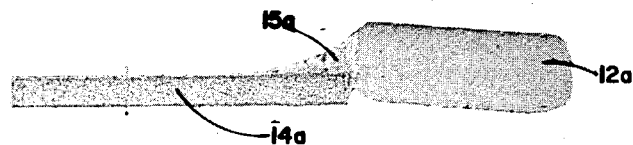
FIG. 3 is a photographic cross-section view, magnified 140 times, of a lead from a circuit imperfectly attached to a copper printed circuit, showing the joining of the lead with the copper circuit by formation of a fillet-light juncture of soldering material between one end of the lead and an edge of the copper circuit, by showing excellent wetting characteristics of the soldering material by virtue of the meniscus of soldering material uniformly spread on the surfaces on the lead and copper circuit.

Referring to FIGS. 1, 2 and 3, typical components to be bonded as shown at 10, and results obtained are shown photographically in FIGS. 2 and 3. Such components comprise an integrated circuit 11 with one output lead 12. Circuit 11 is usually mounted on an insulating material 13 which has a metallic printed circuit 14 attached to material 13, generally of copper. The metallic circuit is generally pretinned with soldering material 15.

The photographically enlarged cross-section of FIG. 2 depicts a portion of lead 12 bonded to metallic material 14 by means of soldering material 15. In practical applications, it may be seen from FIG. 2 that the metals to be bonded are mechanically held together by the soldering material, mechanically holding the metals together at the time of soldering in most cases being impractical and costly. Therefore, as will be shown hereinbelow, such a process that can successfully increase the electrical conductivity between the metals bonded will contribute towards a better electrical bonding juncture. Achieving such increased electrical conductivity is accomplished by minimization of the porous character of the soldering material 15, made possible through the use of the hydrazine gaseous compounds in both the process of bonding and reduction of pores in the such soldering material.

A further beneficial result is realized in the inventive bonding process by examination of the photographic results shown in FIG. 3. This figure is a cross-section view quite similar to that of FIG. 2, but herein lead 12a accidentally slipped when attempting to bond it to metallic substance 14a with soldering material 15a. However, in inspection of this imperfect joint, another benefit is shown through the use of the instant bonding process. It may be seen that the solder efficiently wetted the surfaces of metals 12a and 14a by spreading thereover and providing a fillet-like filling of soldering material between one end of metal 12a and one end of metal 14a, as well as providing a meniscus or film of the soldering material over the upper surfaces of metals 12a and 14a, thereby indicating the adhesive or wetting characteristics of the soldering material to the metals which is possible to obtain with the instant process.

An apparatus for bonding lead 12 and printed circuit 14 by means of soldering material 15, is shown at 20. Apparatus 20 consists of a stainless steel container 21 for retaining the hydrazine compound in liquid form. Hydrazine compounds, have the formulation $R_1R_2NNHR_3$ as above described in the section on hydrazine fluxes and method of usage, and used in this process, are known to be highly reactive with metal oxides, and stainless steel is used to assure safe storage of the hydrazine fluid until ready for use in the process.

Container 22, generally or stainless steel is provided for storage of a carrier gas therein such as nitrogen, helium, argon, krypton, xenon or any gas not reactive with the hydrazine compound. Hydrogen gas may also be used as a carrier. Control valve 30 for controlling or shutting off the flow of hydrazine compound is interposed between the mouth of tank 21 and an input port to means 23. Control valve 31 for controlling or shutting off the flow of carrier gas is interposed between the mouth of the tank 22 and another input port of means 23.

Means 23 interconnects containers 21 and 22 through valves 30 and 31 respectively, and provides means for mixing the hydrazine compound and the carrier gas.

One end of electrical insulating tubing 24 is attached to the end 23a of means 23, and the other end of tubing 24 is attached to end 25a of hollow heating element 25. Element 25 is made in the shape indicated to obtain concentration of heat at the mouth or exit end 25b of heater element 25.

Tubing 24 is used to provide electrical insulation between metallic tubing 23 and heater 25. The heater element is wound with resistance wire, which ends are connected to power input leads 26 and 27. Power may be regulated to obtain the desired heat output from the resistance element by interposing a voltage level control device (not shown) between power leads 26 and 27 and the electrical power source.

Likewise the desired flow of hydrazine from tank 21 may be set by adjusting control valve 30, and flow of carrier gas from tank 22 may be set by adjusting control valve 31.

With the flow rates and temperatures established and device 10 properly positioned with respect to the opening 25b, when the hydrazine fluid passes heater 25 it vaporizes into its gaseous state and the gaseous mixture of hydrazine and carrier gas is directed, as shown by arrow 29, at the surfaces of metals 12 and 14 and soldering material 15 to form a bond between metals 12 and 14 and soldering material 15, as depicted in FIGS. 2 and 3.

Hence, a process for bonding metals with soldering material may consist of a number of steps utilizing the above described apparatus 20.

Such steps include applying the soldering material 15 to at least some of the metallic surfaces, such as surface of metal 14, and positioning metals to be bonded in proper relation to the opening 25b of apparatus 20. A hydrazine compound in its liquid state is transported by a gaseous carrier, such as stated hereinabove, which gaseous carrier is inert to the hydrazine compound. Any number of hydrazine compounds will be effective. One such compound particularly effective has the formulation $R_1R_2NNHR_3$ as above described in the section of hydrazine fluxes and method of usage. The mixture of the hydrazine compound and carrier gas is then heated by means of heater 25 and the hydrazine compound is transformed to its gaseous state. The mixture of gaseous hydrazine and carrier gas is directed at and passed over the metals 12 and 14 and the soldering material 15, the soldering material wetting the surfaces of the metals and forming a bond between the metals and the soldering material.

It is also possible by using gaseous hydrazine in tank 21 to perform the bonding operation without a carrier gas, in which case flow of carrier gas from tank 22 would be blocked-off by shutting off valve 31.

It is pointed out that other hydrazine compounds may be substituted for the hydrazine compound $R_1R_2NNHR_3$, above described, basically such hydrazine compounds are as stated in the Chemical Rubber Company (CRC) Handbook of Chemistry and Physics, 49th Edition, 1968–1969, Pages C367–C369.

The Film Removal and Pore Minimization Processes, and Apparatus Therefor

Figure 4:
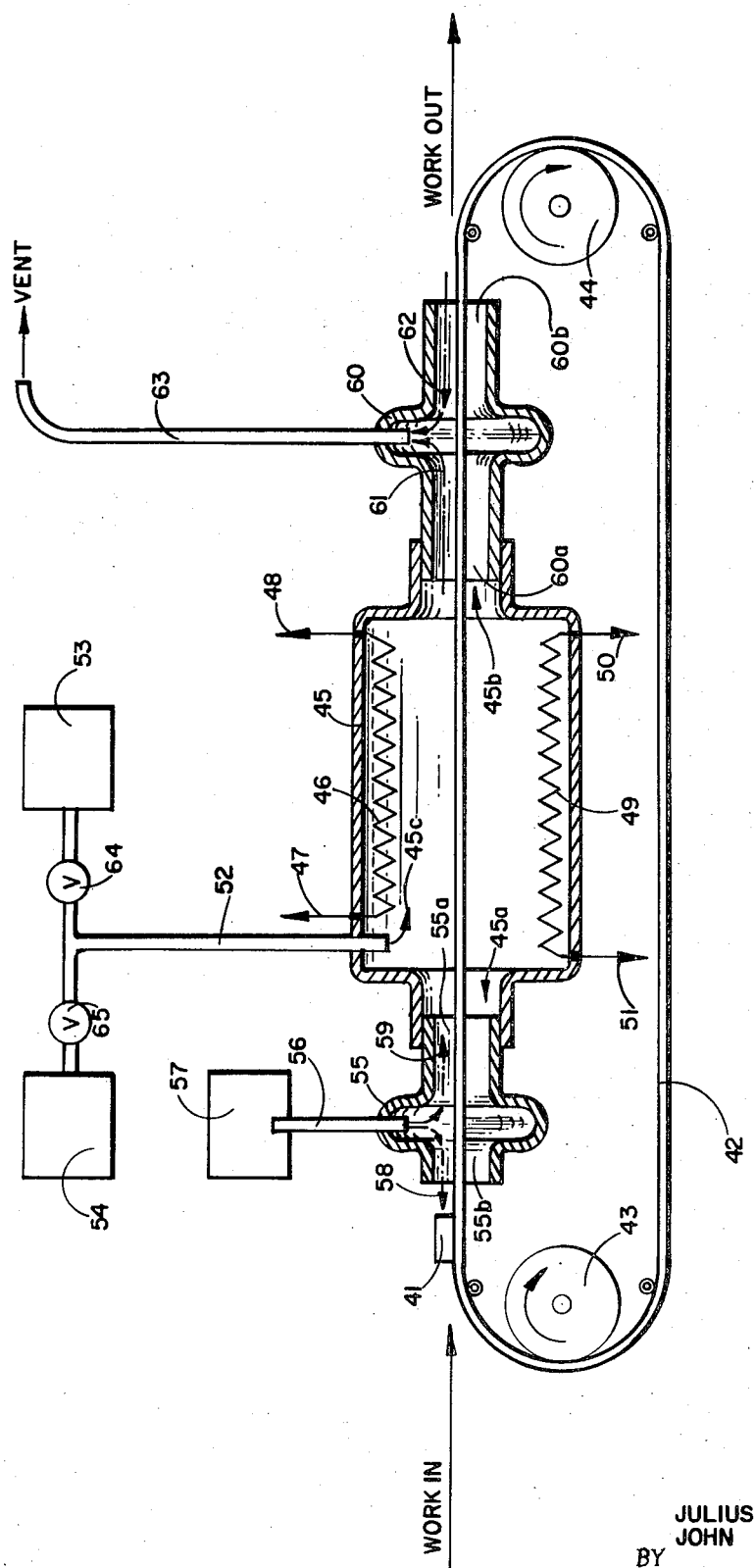
FIG. 4 is a schematic view of a power driven apparatus for processing removal of oxide and other chemically formed films on metallic surfaces, or for processing metallic metals having porous structure in soldering films thereon to enable minimization of porous structure in the soldering films, in accordance with this invention.

Referring to FIG. 4, an apparatus used in the process of removing film compound formation from metallic surfaces and the minimizing of porous formation in the soldering material attached to metallic surfaces is diagrammatically depicted.

Such a metallic material that may have a film compound formation thereon formed from the metallic material of the metal per se, due to oxidation or other chemical formations thereon, or that may have a film soldering material on one of the surfaces is shown at 41, positioned on endless conveyor belt 42. Belt 42 is driven by means of roller 43 which may be coupled to an electrical motor (not shown). Roller 44 is used to take-up the slack in belt 42, and is freely rotating thereby being driven when belt 42 is translated by rotation of roller 43.

Heater chamber 45 is provided with upper heater element 46 electrically connected by means of wires 47 and 48 to external power means, and lower heater element 49 electrically connected by means of wires 50 and 51 to the same external power means. The heating chamber has entrance port 45a for permitting injection of a workpiece of the metal such as that at 41. The heating chamber also has an exit port 45b, oppositely disposed to entrance 45a, for ejecting said workpiece. Also provided is a fluid entrance port 45c in the heating chamber to which is coupled means 52, generally of a T-configured stainless steel pipe system, one end arm of the T being coupled to one end of hydrazine flow control valve 64 and the other end of valve 64 being coupled to stainless steel hydrazine-containing vessel 53, and the other arm of the T being coupled to one end of carrier gas flow control valve 65, and the other end valve 65 being coupled to stainless steel carrier gas containing vessel 54. Vessel 54 may contain such gases as a helium, argon, crypton, xenon, and are selected because such carrier gases are not reactive with hydrazine fluid. Under certain circumstances, vessel 54 may contain hydrazine in its gaseous state.

A gas barrier means is provided at 55. Means 55 has a carrier gas feedline 56, made of stainless steel, one end of line 56 being connected to barrier means 55 and the other end to stainless steel vessel 57. Vessel 57 may contain any of the carrier gases hereinabove stated. One end 55a of the gas barrier means is coupled to one end at 45a of the heating chamber. The other end 55b of gas barrier means 55 is therefore the point at which workpiece 41 is injected into the apparatus for processing.

Gas barrier means 60 has an exhaust vent at its upper portion connected to one end of a stainless steel pipe 63, the other end of pipe 63 being remotely located for venting such gases as a result from operation of the process and any air as may be injected into the system from the atmosphere. Barrier means 60 has end 60a coupled to exit port 45b of the heating chamber. Opening 60b in barrier means 60 is therefore provided whereat the workpiece is ejected from the apparatus by the conveyor belt upon completion of processing. Hence conveying means 42 is used for carrying the workpiece through the system during operation of the process. The conveying means enters opening 55b of barrier means 55, passes through heating chamber 45, and exits through opening 60b of barrier means 60, thereby transporting the workpiece through the chamber for enabling the gaseous hydrazine compound to act upon the workpiece so as to remove the film compound formation from the metallic surface of the workpiece. Such film compound formation may be either an oxide of the metal of the metallic material of the workpiece or may be some other chemically formed film on such workpiece.

Wherein the object is to minimize porous formation in the soldering material layer attached to the workpiece, the same apparatus is used for achieving such results.

It is also pointed out that gas barrier means 55 has a function of keeping out ambient oxygen at opening 55b due to pressure which is greater than atmospheric pressure provided by the carrier gas stored in vessel 57. Such pressure provides a flow of carrier gas as depicted by arrow 58 in opposition to atmospheric air pressure and flow 59 into chamber 45 which provides carrier gas additive to the carrier gas that is fed from vessel 54.

Likewise, direction flow of hydrazine gas and carrier gas from heating chamber 45 and into pipe 63 will serve to cause exhaust gases shown by arrow 61 used in the process to be vented thereby and at the same time oppose ambient air entering from the immediate work area as depicted by arrow 62, said ambient air instead of being injected into the heating chamber will be vented through pipe 63.

Hence a process for removing film compound formation from the surface of a metal or a process for minimizing porous formation in the soldering material which is attached to a metallic surface, consists of the number of steps utilized in connection with the described apparatus of FIG. 4.

Such steps include transporting a hydrazine compound in its liquid state by a gaseous carrier, hereinabove stated, which is inert to the hydrazine compound. The hydrazine compound will generally have the formulation $R_1R_2NNHR_3$ as above stated, but it is possible to utilize other hydrazine compounds exemplified by such compounds as are listed in the Chemical Rubber Company (CRC) handbook of Chemistry and Physics, 49th Edition 1968–1969, Pages C367–C69.

The hydrazine compound is then vaporized, due to the heat provided in the heating chamber, to its gaseous state for reacting the gaseous hydrazine with either the aforesaid film compound formation or the soldering material film on the workpiece, thereby removing the film compound formation from the surface of the metal of the workpiece or closing most of the pores in the soldering material film, as the case may be.

Regulation of the flow of hydrazine fluid may be achieved by adjustment valve 64, and the flow rate of carrier gas may be achieved by adjustment of valve 65. It is possible to shut off the entire flow of hydrazine fluid or the entire flow of carrier gas by shutting valves 64 and 65, respectively.

It is also possible, by using gaseous hydrazine in vessel 53 to perform the aforestated process without the use of such carrier gas as may be contained in vessel 54. In this instance, aside from adjusting a proper flow rate for such hydrazine gas as may be contained in vessel 53 by resetting of valve 64, valve 65 may be closed thereby shutting off the gas flow from vessel 54 into the system. In the process where hydrazine gas is used as a starting point, the gas pressure in vessel 53 would have to be greater than the pressure at which fluid hydrazine is contained therein.

The results of either of the processes bring about effective wetting of the surfaces of the metals with soldering material, by means of the aforestated process step procedures, so as to close porous formation therein. Such efficient wetting of surfaces is depicted by photographic results shown in FIG. 3 wherein a meniscus of soldering material is formed over surfaces of metals 12a and 14a, as well as the fillet 15 of such soldering material filling in and joining the space between the ends of metals 12a and 14a.

We claim:

1. An apparatus wherein a hydrazine compound and a carrier gas are utilized from the surface of a workpiece made of a metal, where the formations were formed from the metallic material of the metal, comprising in combination:
    a heating chamber having an entrance port for injecting a workpiece of said metal and an exit port for ejecting said workpiece, and having a fluid entrance port, and means coupled to said fluid entrance port for transferring a mixture of the hydrazine compound in its liquid state and carrier gas to said heating chamber;
    first gas barrier means having a carrier gas feed, one end of the first gas barrier means being coupled to the entrance port which is used for injecting the workpiece;
    second gas barrier means having an exhaust vent, one end of the second gas barrier means being coupled to said exit port; and
    conveying means for carrying said workpiece, said conveying means entering the other end of the first gas barrier means, passing through the heating chamber, and exiting through the other end of the second gas barrier means thereby transporting said workpiece through said chamber for enabling the gaseous hydrazine compound to act upon the workpiece so as to remove said film compound formations.

2. An apparatus wherein a hydrazine compound and a carrier gas are utilized from minimizing porous formations in the soldering material attached to a workpiece made of metals which metals are joined by said soldering material, comprising in combination:
    a heating chamber having an entrance port for injecting a workpiece of said metals and for ejecting said workpiece and having a fluid entrance port, and means coupled to said fluid entrance port for transferring a mixture of said hydrazine compound and carrier gas to said heating chamber;
    first gas barrier means having a carrier gas feed, one end of the first gas barrier means being coupled to said entrance port;
    second gas barrier means having an exhaust vent, one end of the second gas barrier means being coupled to said exit port; and
    conveying means for carrying said workpiece, said conveying means entering the other end of the first gas barrier means, passing through the heating chamber, and exiting through the other end of the second gas barrier means, and transporting said workpiece through said chamber for enabling the gaseous hydrazine compound to act upon the workpiece thereby minimizing said porous formation.

3. An apparatus used in the process of film removal from the surface of a metal workpiece and for minimizing porous formation in the soldering material attached to the workpiece, wherein the process utilizes a fluid compound and a carrier gas comprising in combination:
    a heating chamber having an entrance port for injecting said workpiece and compound exit port for ejecting said workpiece, and having a fluid entrance port, and means coupled to the fluid entrance port for providing a mixture of the compoun and carrier gas to the chamber;
    first barrier means having a carrier gas feed, one end of the first gas barrier means being coupled to the entrance port used for injecting the workpiece;
    second gas barrier means having an exhaust vent, one end of the second gas barrier means being coupled to said exit port for removing effluents of the process; and
    conveying means for carrying said workpiece, said conveying means entering the other end of the first gas barrier means, passing through the heating chamber, and exiting through the other end of the second gas barrier means thereby transporting said workpiece through said chamber for enabling the compound in its gaseous state to act upon the workpiece for removing said film as for minimizing the porous formation in said soldering material.

* * * * *